Dec. 20, 1927. 1,653,589
C. P. ROSS
PIVOTED GATE FOR SKIP HOISTS
Filed June 7, 1926 3 Sheets-Sheet 1

Inventor
Clyde P. Ross
by Frank J. Schraeder Jr.
Attorney

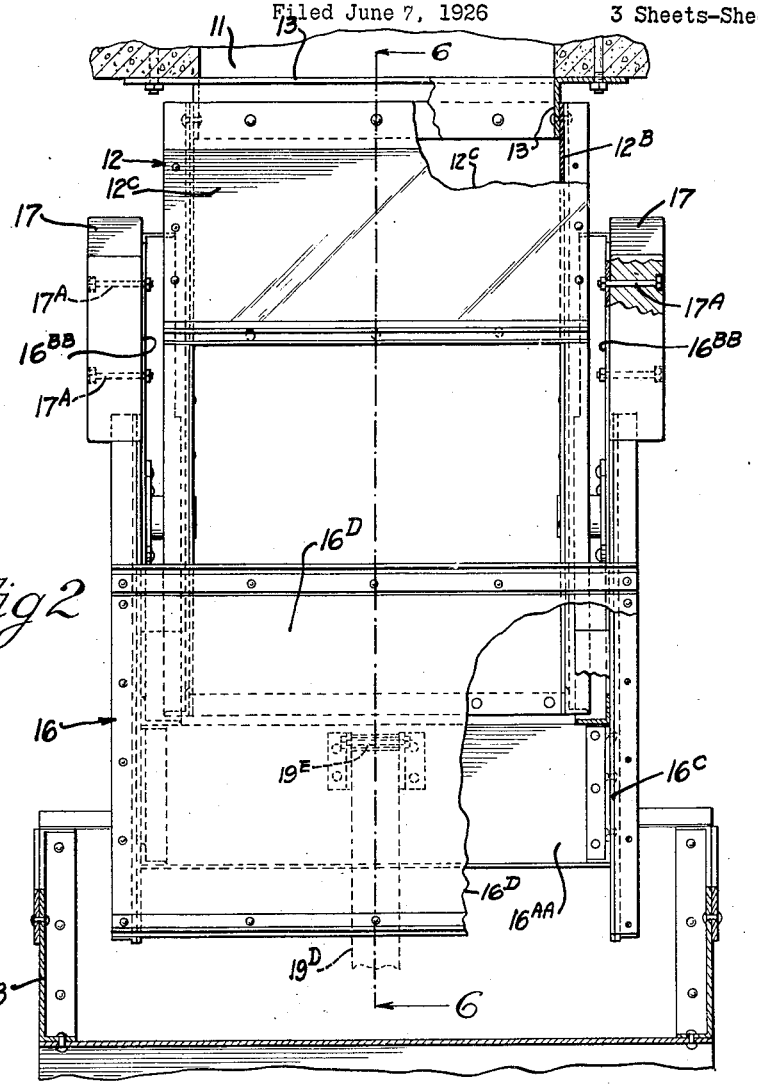
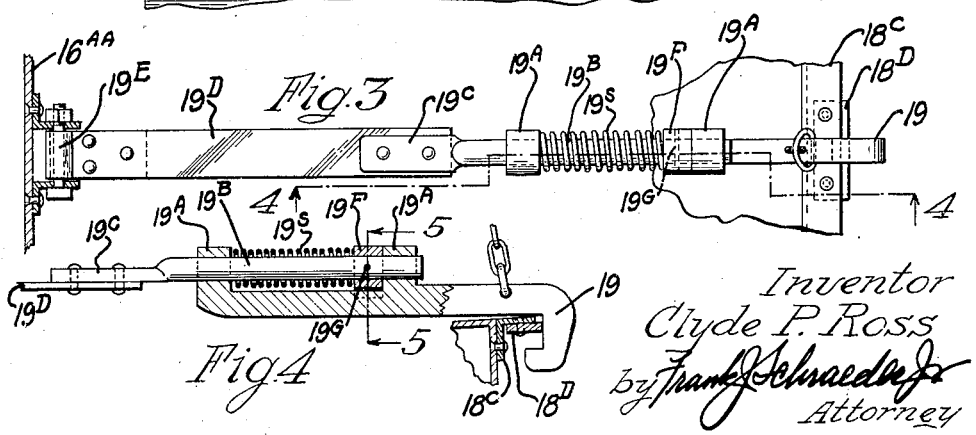

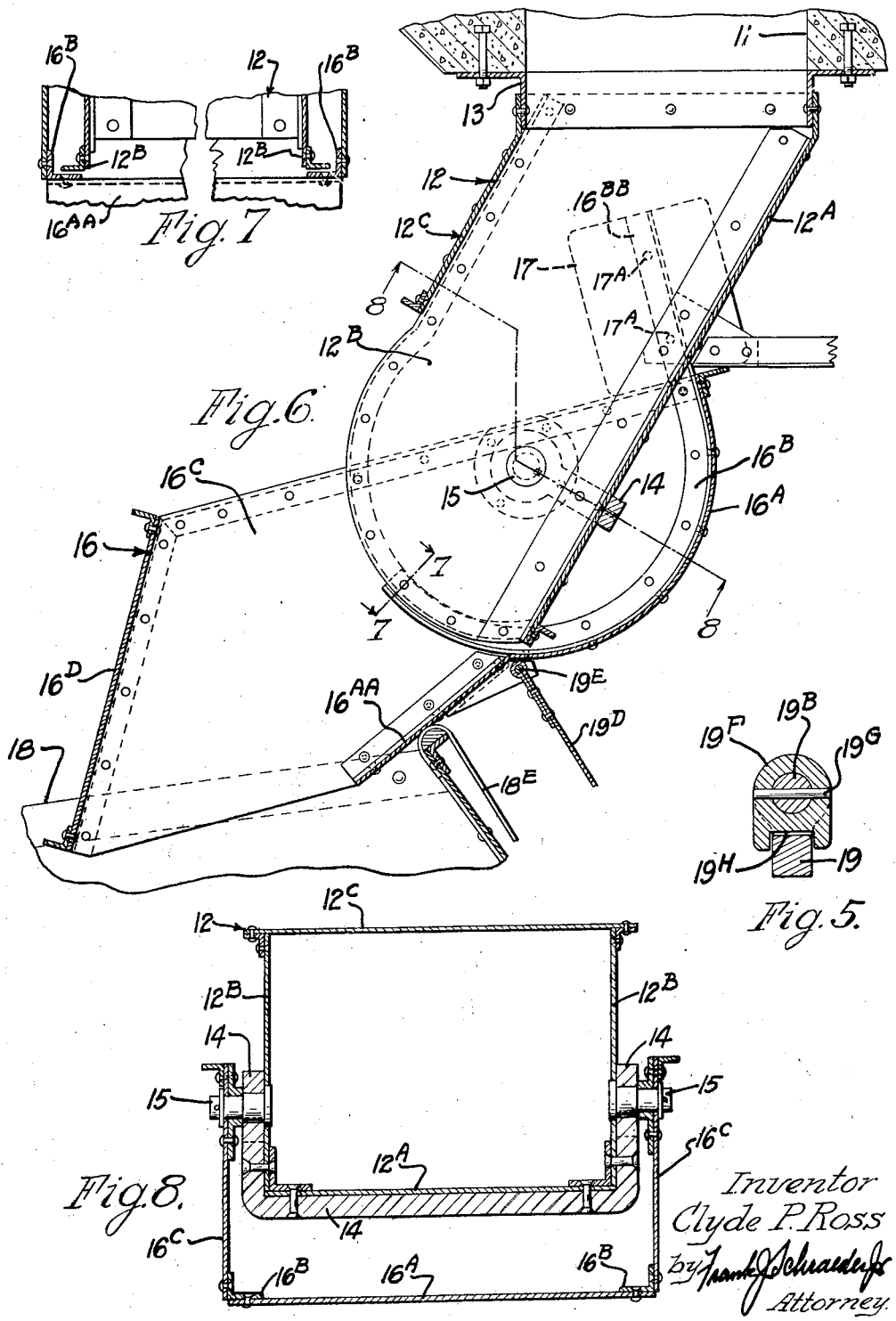

Patented Dec. 20, 1927.

1,653,589

UNITED STATES PATENT OFFICE.

CLYDE P. ROSS, OF KENILWORTH, ILLINOIS.

PIVOTED GATE FOR SKIP HOISTS.

Application filed June 7, 1926. Serial No. 114,110.

This invention relates generally to improvements in pivoted gates for skip-hoists for handling granular materials from a hopper to an elevated dumping point and has particular reference to certain details and novel features of construction tending to increase the general efficiency and serviceability of apparatus of this character.

It is among the objects of this invention to provide a novel gate construction having an attached counter-weight which lies in the plane of the gate side and which counter-weight is supported directly on the frame of the gate side. In a preferred form two counter-weights are employed, one for each side of the gate.

Another object of the invention finds embodiment in the provision of a single hook for moving the gate into open position by the force of the skip bucket, which hook is pivotally connected to the underside of the gate and relatively centrally between the gate pivotal bearings, thus avoiding any twisting of the gate about its pivotal support such as may be present if two spaced hooks are employed.

A further object of the invention is found in the particular construction of the gate tilting hook including a shock absorbing spring and flexible means for supporting the hook in operative position for engagement by the bucket.

With the above and other objects in view, my invention consists in the novel combination, construction and arrangement of the parts and members shown in the accompanying drawings, described in the following specifications and particularly pointed out in the appended claims.

Referring to the drawings:

Figure 2 is a sectional view on line 2—2 of Figure 1, showing the gate in open position with a portion thereof broken to show the interior.

Figure 3 is a plan view of the gate tilting hook and Figure 4 is a section of same taken on line 4—4 of Figure 3.

Figure 5 is a cross section taken on line 5—5 of Figure 4, showing the grooved or channeled collar.

Figure 6 is a cross section of the gate and chute taken on line 6—6 of Figure 2.

Figure 7 is a cross section taken on line 7—7 of Figure 6.

Figure 8 is also a cross section taken on line 8—8 of Figure 6 showing the pivotal gate support on the chute.

Figure 1:
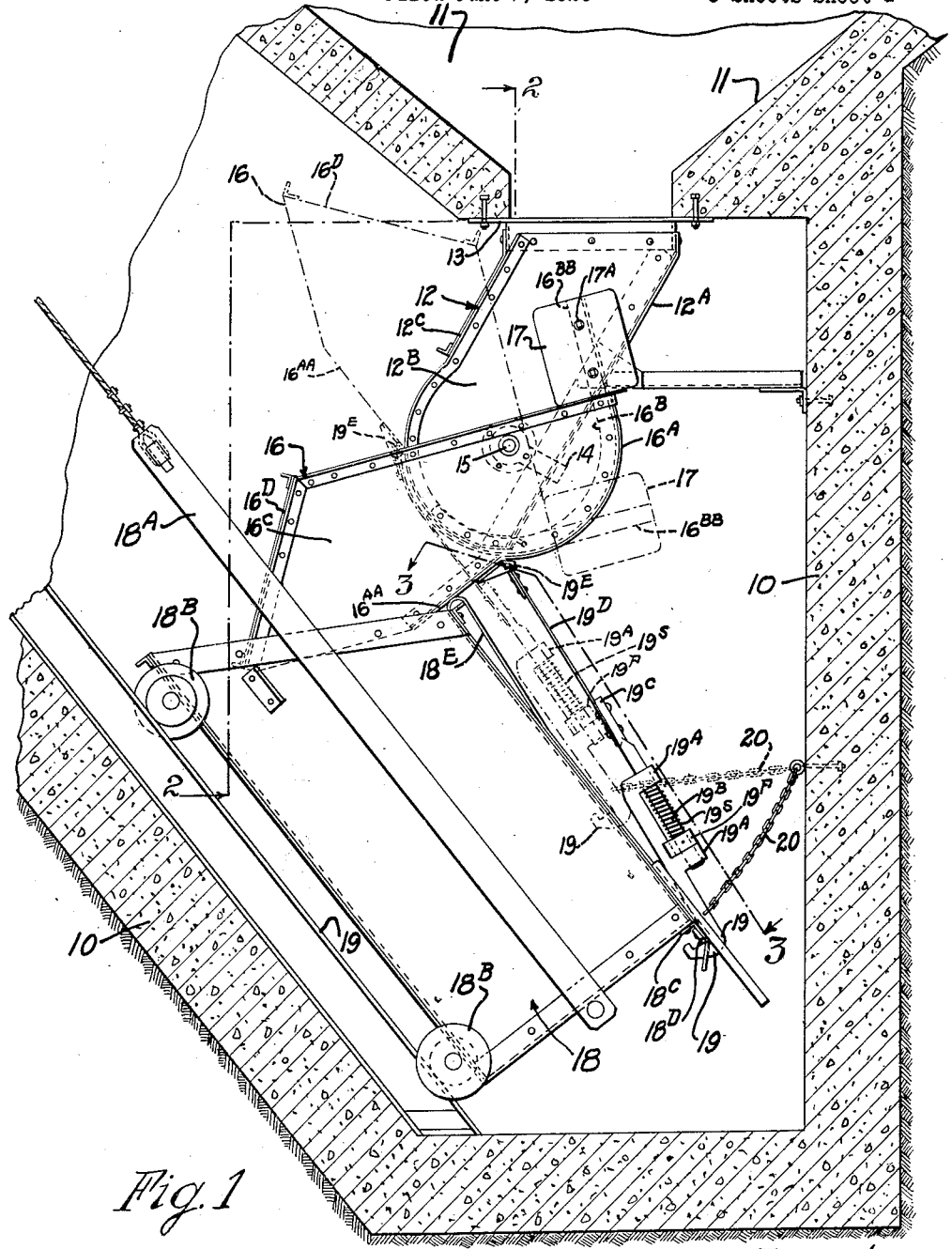
Figure 1 is a cross section of a hopper pit showing the skip-bucket in loading position with the gate open permitting the flow of the material directly into the bucket.

In the illustrations 10 indicates the concrete pit walls and 11 a hopper adapted to receive granular materials such as coal, sand and the like, which hopper is adapted to permit the flow of the materials into a chute 12.

The chute 12 of sheet metal construction consists generally of a bottom $12^A$, side plates $12^B$ and a cover plate $12^C$ extending partly over the top thereof. An angle iron frame 13 connects the chute 12 to the bottom of the hopper 11.

The chute 12 is provided with a substantial yoke 14 which is securely riveted to the chute sides and corner angles and which yoke 14 carries a pair of pins 15 which act as pivotal supports for the gate 16.

The gate 16 consists of an arcuate gate plate $16^A$ formed with an integral flat extension $16^{AA}$. The gate plate $16^A$ is riveted to the arcuate corner angles $16^B$ which are securely riveted to the gate side plates $16^C$, the angles $16^B$ at their lower ends extend a short distance above the gate plate extension $16^{AA}$ and their upper ends $16^{BB}$ are formed straight and at a tangent to the curved portions. The upper portions $16^{BB}$ of the structural angles $16^B$ extend above the sides $16^C$ of the gate and a flat counterweight 17 is securely attached to each portion $16^{BB}$ with bolts $17^A$. This arrangement throws the effective pressure of the counterweights directly on the gate and near its pivotal support and affords not only a very economical form of construction but places the effective pressure of the counterweight directly on the gate sides. A front plate $16^D$ connecting the side plates $16^C$ acts to prevent the materials from charging over the front of the bucket 18.

Any suitable type of skip bucket may be employed. I have shown the bucket 18 provided with a bail $18^A$ and rollers $18^B$ which ride on tracks 19 which extend from the pit to the elevated dump.

On the bottom of the bucket 18 and at its rear end is a reenforcing angle $18^C$ provided with a centrally mounted reenforcing plate $18^D$ forming a seat which is adapted to engage the hook 19.

The hook 19 is formed with a pair of integral bearings 19^A within which is a slidably mounted bar 19^B of round cross section having a flattened portion 19^C which is riveted to the spring steel extension 19^D which is pivotally connected at 19^E to the bottom side of the gate 16 and centrally between its sides. The bar 19^B is provided near its lower end with a collar 19^F which is fixed to the bar with a pin 19^G. The collar 19^F is provided with a groove or channel 19^H for the hook 19 to prevent any relative rotation between the hook 19 and the bar 19^B. A coil spring 19^S extends about the bar 19^B between the collar 19^F and the upper bearing 19^A. A flexible chain 20 or cable secured to the pit wall at one end and at its other end to the hook 19 for positively retaining the hook in operative position for engagement by the bucket when the gate 16 is in closed position.

In operation, the bucket 18 in its descending movement into the pit, engages with its plate 18^D, the hook 19, and thus draws the gate 16 from the closed position shown dotted in Figure 1, into open position to permit the direct discharge of the materials from the hopper 11 into the bucket. When the bucket 18 engages the hook 19, the spring 19^S is compressed to absorb the initial shock. When the bucket is filled and begins its upward movement the spring 19^S expands to normal position and the gate 16 is gradually closed against the pressure of the material by the engagement of the wearing strips 18^E and the cooperative action of the counterweights 17. When the bucket is elevated from the pit the hook 19 and support 20 assume the position shown in dotted lines in Figure 1.

I claim:

1. The combination with a material discharge chute and a pivotally mounted gate therefor, of a single yielding hook attached to said gate centrally between its pivotal supports, a counterweight secured directly to said gate, and a movable bucket adapted to engage said hook to open said gate against the pressure of said counterweight to thereby permit the flow of the material from said chute into said bucket.

2. The combination with a material discharge chute and a gate pivotally mounted on said chute, of a single hook pivotally mounted to the bottom of said gate and centrally between its pivotal supports, said hook including a pair of relatively movable members and a single resilient element between said members, and a movable bucket adapted to engage one of said hook members to compress said resilient element during the downward movement of said hook to open said gate against the pressure of said counterweight to thereby permit the flow of the material from said chute into said bucket.

3. The combination of a chute, a gate pivotally mounted on said chute and comprising a bottom plate, a pair of side plates, a pair of angle irons securing said bottom and side plates together, and a counterweight attached to each of said angle irons in the plane of said sides for retaining said gate in closed position.

4. Apparatus as embodied in claims 8, and including an elevated bucket and means operable by said bucket for moving said gate into open position to permit the discharge of material from said chute into said bucket.

In witness whereof I affix my signature.

CLYDE P. ROSS.